(12) United States Patent
Hu et al.

(10) Patent No.: US 12,047,994 B2
(45) Date of Patent: *Jul. 23, 2024

(54) BANDWIDTH ALLOCATION USING MACHINE LEARNING

(71) Applicant: Hughes Network Systems, LLC, Germantown, MD (US)

(72) Inventors: Bin Hu, Germantown, MD (US); Yeqing Tang, Germantown, MD (US); Rajarshi Roy, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,725

(22) Filed: Oct. 24, 2022

(65) Prior Publication Data

US 2023/0043526 A1   Feb. 9, 2023

Related U.S. Application Data

(63) Continuation of application No. 16/732,252, filed on Dec. 31, 2019, now Pat. No. 11,503,615.

(51) Int. Cl.
*H04B 7/216* (2006.01)
*G06N 5/04* (2023.01)
(Continued)

(52) U.S. Cl.
CPC ............ *H04W 72/543* (2023.01); *G06N 5/04* (2013.01); *G06N 20/00* (2019.01); *H04B 7/212* (2013.01);
(Continued)

(58) Field of Classification Search
CPC .... H04B 7/185; H04B 7/18513; H04B 7/212; H04B 17/382; G06F 9/5027; G06N 5/04;
(Continued)

(56) References Cited

U.S. PATENT DOCUMENTS 5,812,526 A   9/1998 Chang et al.
5,995,805 A   11/1999 Ogasawara et al.
(Continued)

FOREIGN PATENT DOCUMENTS

GB   2582165   9/2020

OTHER PUBLICATIONS

Camarda et al., "A dynamic bandwidth resource allocation based on neural networks in euroskyway multimedia satellite system," International Journal of Communication Systems, 2002, pp. 1-25.
(Continued)

*Primary Examiner* — Frank Duong
(74) *Attorney, Agent, or Firm* — Fish & Richardson P.C.

(57) ABSTRACT

Methods, systems, and apparatus, including computer programs encoded on computer-storage media, for bandwidth allocation using machine learning. In some implementations, a request for bandwidth in a communications system is received. Data indicative of a measure of bandwidth requested and a status of the communication system are provided as input to a machine learning model. One or more outputs from the machine learning model indicate an amount of bandwidth to allocate to the terminal, and bandwidth is allocated to the terminal based on the one or more outputs from the machine learning model.

20 Claims, 4 Drawing Sheets

(51) Int. Cl.
  *G06N 20/00* (2019.01)
  *H04B 7/212* (2006.01)
  *H04J 3/16* (2006.01)
  *H04W 24/08* (2009.01)
  *H04W 72/0446* (2023.01)
  *H04W 72/543* (2023.01)

(52) U.S. Cl.
  CPC ........... *H04J 3/1694* (2013.01); *H04W 24/08* (2013.01); *H04W 72/0446* (2013.01)

(58) Field of Classification Search
  CPC ...... G06N 20/00; H04J 3/1605; H04J 3/1694; H04J 2203/0067; H04J 2203/0069; H04L 2012/5631; H04L 2012/5632; H04L 2012/6456; H04W 24/08; H04W 72/0446; H04W 72/087; H04W 72/543
  See application file for complete search history.

(56) References Cited

U.S. PATENT DOCUMENTS

| | | | |
|---|---|---|---|
| 6,650,869 | B2 | 11/2003 | Kelly et al. |
| 6,882,623 | B1 | 4/2005 | Goren et al. |
| 6,947,378 | B2 | 9/2005 | Wu et al. |
| 6,987,741 | B2 | 1/2006 | Kelly et al. |
| 7,099,330 | B2 | 8/2006 | Chiussi et al. |
| 7,130,283 | B2 | 10/2006 | Vogel et al. |
| 7,336,967 | B2 | 2/2008 | Kelly et al. |
| 7,619,968 | B2 | 11/2009 | Kelly et al. |
| 7,656,813 | B2 | 2/2010 | Kloper |
| 7,668,966 | B2 | 2/2010 | Klinker et al. |
| 8,559,465 | B2 | 10/2013 | Brooks et al. |
| 8,675,486 | B2 | 3/2014 | Friedman et al. |
| 8,681,614 | B1 | 3/2014 | McCanne et al. |
| 8,687,493 | B2 | 4/2014 | Torres et al. |
| 9,325,951 | B2 | 4/2016 | Saptharishi |
| 9,634,945 | B2 | 4/2017 | Stevens et al. |
| 9,686,204 | B2 | 6/2017 | Kakadia et al. |
| 9,838,296 | B2 | 12/2017 | Armolavicius et al. |
| 10,110,300 | B2 | 10/2018 | Xu et al. |
| 10,243,801 | B2 | 3/2019 | Xu et al. |
| 10,594,027 | B1 | 3/2020 | Arora et al. |
| 10,902,287 | B2 | 1/2021 | Zaifman et al. |
| 2001/0043573 | A1 | 11/2001 | Kelly |
| 2003/0027522 | A1 | 2/2003 | Valdivia et al. |
| 2013/0080641 | A1 | 3/2013 | Lui et al. |
| 2013/0136004 | A1* | 5/2013 | Torres ................ H04B 7/18582 370/236 |
| 2015/0289279 | A1 | 10/2015 | Xu et al. |
| 2015/0296409 | A1 | 10/2015 | Xu et al. |
| 2016/0088627 | A1 | 3/2016 | Tayrac et al. |
| 2016/0330746 | A1 | 11/2016 | Mehrabanzad et al. |
| 2017/0250751 | A1 | 8/2017 | Kargieman et al. |
| 2018/0309678 | A1 | 10/2018 | Dillon |
| 2019/0013860 | A1 | 1/2019 | Xu et al. |
| 2019/0137985 | A1 | 5/2019 | Cella et al. |
| 2019/0140952 | A1 | 5/2019 | Torres et al. |
| 2019/0207672 | A1* | 7/2019 | Arora ................ H04B 7/18584 |
| 2020/0044979 | A1* | 2/2020 | Kubba .................. H04L 47/522 |
| 2020/0073742 | A1* | 3/2020 | Arora ....................... G06N 5/01 |
| 2021/0204300 | A1 | 7/2021 | Hu et al. |

OTHER PUBLICATIONS

International Preliminary Report on Patentability in International Appln. No. PCT/US2020/066522, dated Jul. 14, 2022, 8 pages.

International Search Report and Written Opinion in International Appln. No. PCT/US2020/066522, dated Apr. 30, 2021, 15 pages.

* cited by examiner

BANDWIDTH ALLOCATION USING MACHINE LEARNING

CROSS-REFERENCE TO RELATED APPLICATION

This application is a continuation of U.S. application Ser. No. 16/732,252, filed Dec. 31, 2019, which is incorporated by reference herein in its entirety.

BACKGROUND

Many systems use bandwidth allocation techniques to allocate limited communication resources among many different devices. Bandwidth allocations are often made by performing calculations that take into account conditions at many different devices connected to a network.

SUMMARY

In some implementations, a communication system uses a machine learning model to perform bandwidth allocation decisions. The system can use a machine learning approach to train a model using the results calculated using bandwidth allocation algorithms. By training with many examples of results of the algorithms for different conditions, the model learns to predict the results of the algorithm, such as the number of slots allocated to a device given various network conditions. The trained machine learning model can then be deployed and used to make allocation decisions, instead of or alongside the algorithms. The machine learning model can thus be trained to provide allocation decisions that replicate or approximate those of the algorithms. The machine learning model can often generate these allocation decisions more quickly and with less computation than the algorithms themselves.

The techniques of training and using a machine learning model to predict allocation amounts for devices can be used for forward channel allocation (e.g., from the network to the terminal) and/or return channel allocation (e.g., from the terminal to the network). Separate models can be trained and used for forward channel allocation prediction and reverse channel allocation prediction. Thus, the techniques herein can be used for the forward channel or outroute (e.g., the path from a gateway, to a satellite, and then to a terminal) as well as the return channel or inroute (e.g., the path from a terminal, to a satellite, then to a gateway).

As allocation algorithms continue to improve to handle an increasing number of situations, the allocation algorithms are also becoming more complicated. The computational resources required to execute bandwidth allocation algorithms in each communication frame are becoming more demanding. The algorithms also involve many intermediate calculations to determine how many slots should be allocated to each of multiple terminals that are concurrently connected to the system. These calculations typically involve factors related to terminal and the capacity of the system. The result of the algorithm can be, for example, a number of slots requested for each terminal in each of multiple priority levels.

To reduce the computing resources required for bandwidth allocation, machine learning models can be trained to use the same or similar inputs as the algorithms, and to provide the same type of outputs. The system can monitor the inputs to the algorithms and the corresponding outputs that the algorithms provide over time to generate a set of training data. After collecting many sets of examples (e.g., algorithm inputs and outputs), that data can be used to train a machine learning model (e.g., a neural network, a classifier, a decision tree, etc.) to perform the same function as the algorithms. This training process enables the model to perform the same function as the bandwidth allocation algorithms, but in a somewhat simplified way that decreases the computational demand for determining allocations. This improved efficiency, in turn, can allow lower latency in making allocations, reduced hardware processing requirements, and/or the ability to determine allocations for greater numbers of terminals within the timing and performance requirements of the system.

Accordingly, the machine learning approach may provide a prediction model that can be sufficiently accurate and measurably faster than a direct computational approach, and so can replace the original bandwidth allocation algorithms. With a sufficiently large and varied training data set, it is possible to apply this model to replace the original bandwidth allocation algorithms. As another option rather than always replacing the algorithms, the machine learning model can also work as an addition to backlog allocation algorithms to handle certain cases where the original algorithm may take too much computational resources, such as situations where the number of connected terminals exceeds a threshold.

As discussed further below, allocation data can be collected for the purpose of analyzing the underlying relationship between terminal backlog, inroute capacity, and the actual allocation results. Supervised machine learning can then be used to train a machine learning model, such as a neural network, to be able to predict allocation results. The trained machine learning model and the predicted results it provides can then replace the original bandwidth allocation algorithm to provide relatively accurate results while boosting the performance of the system. In some implementations, the model is used to predict allocations to handle data transfer backlogs for terminals.

The techniques in the application can be used in an inroute group manager (IGM), which can be associated with or integrated into a network gateway, such as a gateway of a satellite communication network. The technique is not limited to predicting inroute allocation, and can be used for outroute allocation also. The techniques can be used for allocation by a virtual network operator (VNO), an inroute bandwidth manager (IBM), an outroute bandwidth manager (OBM), and/or a general bandwidth manager (BWM).

To use the machine learning model, a network gateway (or an IGM or other element of a network) receives a request from a device seeking bandwidth on the network. The gateway forms input to the model based on the request and other network factors, and uses output from the machine learning model to allocate backlog bandwidth for the device. For example, the input to the machine learning model can include data about, for example, (1) the device that set the request, (2) the terminal to gateway connection, and (3) the status of the system or gateway. As noted above, the machine learning model was previously trained using data output by algorithms designed to determine bandwidth allocation, and so can generate allocation results that are typically the same as or very close to results from the algorithms. The output from the model can include a predicted or recommended bandwidth allocation to provide to the device in response to the request. In some implementations, the gateway may select either the machine learning model or the bandwidth allocation algorithms to allocate bandwidth based on factors such as network traffic levels, an amount of connected devices, latency requirements, and so on.

A communication system can be configured to use either allocation algorithms or the machine learning model to determine bandwidth allocations. For example, in periods of low network congestion, e.g., with relatively few devices competing for resources, the algorithms can be used to obtain more accurate, yet more time consuming, allocation results. The output from these calculations may be stored for further training of the machine learning model. In periods of high network congestion, e.g., with relatively high numbers of devices competing for bandwidth, the machine learning model can be used to take advantage of its high efficiency. The machine learning model may not offer the same level of accuracy as the allocation algorithms, but would be preferable in high volume situations where approximations are still sufficient and efficiency is given priority over accuracy.

In one general aspect, a method comprises: receiving a request for bandwidth in a communications system, the request being associated with a terminal; accessing data indicating a status of the communication system; in response to receiving the request, providing, as input to a machine learning model, data indicative of (i) a measure of bandwidth requested for the terminal and (ii) the status of the communication system, wherein the machine learning model has been trained to predict an allocation of bandwidth based on data indicative of an amount of data to be transferred; receiving one or more outputs from the machine learning model that indicate an amount of bandwidth to allocate to the terminal; and allocating bandwidth to the terminal based on the one or more outputs from the machine learning model.

In some implementations, the communication system comprises a satellite communication system.

In some implementations, the request for bandwidth is a request sent by the terminal.

In some implementations, the request for bandwidth is sent by a server sending data to the terminal.

In some implementations, the request comprises an indication of an amount of data transfer backlog for the terminal for each of multiple priority levels.

In some implementations, allocating bandwidth to the terminal comprises allocating one or more slots in a time division multiple access (TDMA) communication frame.

In some implementations, the machine learning model comprises at least one of a neural network, a classifier, a decision tree, a support vector machine, a regression model, a nearest neighbor method such as K-means or K-nearest neighbor, a dimensionality reduction algorithm, or a boosting algorithm.

In some implementations, the method includes: determining a number of terminals or a processor utilization; and determining that the number of terminals or the processor utilization exceeds a threshold. Allocating bandwidth to the terminal based on the one or more outputs from the machine learning model is performed at least in part based on determining that the number of terminals or the processor utilization exceeds a threshold.

In some implementations, the machine learning model is provided at least one of a priority of data to be transferred, a type of data to be transferred, a bandwidth limit associated with the terminal, a terminal identifier, a quality of service level, or an error correction rate.

In some implementations, the method includes providing, to the terminal, an indication of the amount of bandwidth to allocate to the terminal.

In some implementations, the data indicating the status of the communication system comprises data indicating current demand or throughput of the system.

In some implementations, the data indicating the status of the communication system comprises data indicating prior demand or throughput of the system.

In some implementations, the data indicating the status of the communication system comprises a data transfer capacity or an available bandwidth of the communication system.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
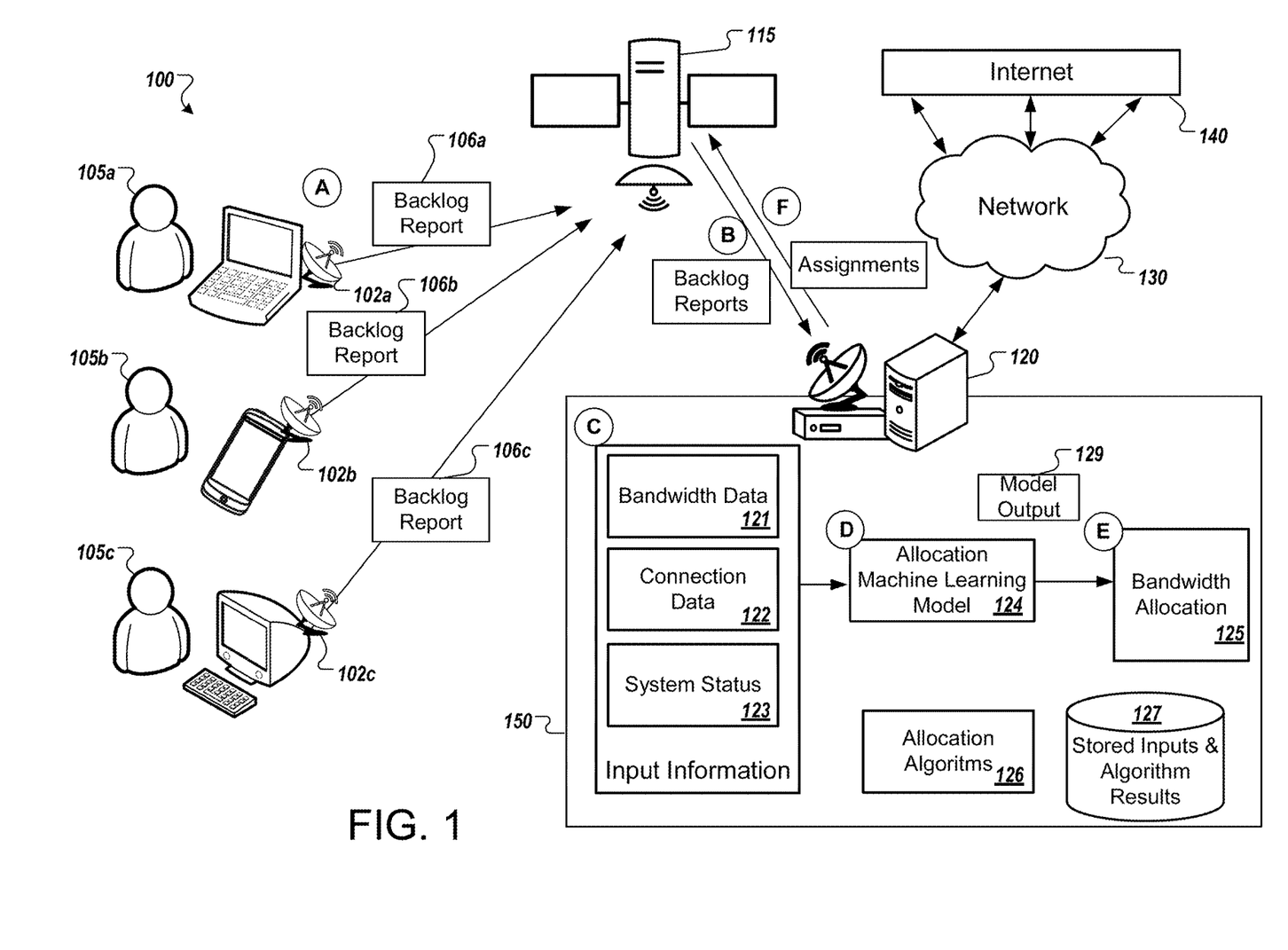
FIG. 1 is a diagram showing an example of a system for bandwidth allocation.

FIG. 1 is a diagram showing an example of a system 100 for bandwidth allocation. The example of FIG. 1 shows a satellite communication system, but the techniques can be used in other communication systems also. The system 100 includes a gateway 120 that communicates with a satellite 115, and the satellite 115 communicates with various satellite terminals 102a-102c. The satellite 115 and the gateway 120 (along with potentially other network components) cooperate to transfer data to and from the terminals 102a-102c to a network 130, which can include the Internet 140. Each of the terminals 102a-102c can be in communication with one or more client devices, such as phones, laptop computers, desktop computers, Internet of Things (IoT) devices, and so on, which make use of the network connections the terminals 102a-102c, the satellite 115, and the gateway 120 provide.

In the example of FIG. 1, the gateway 120 includes functionality to allocate limited data transfer bandwidth among the various terminals 102a-102c that are concurrently connected. This functionality may be implemented as an IGM, a bandwidth manager, or in another form.

The system 100 can use a time division multiple access (TDMA) channel access method, and so the allocation of bandwidth to the terminals 102a-102c can be made through the assignment of slots in the TDMA communication frame. An IGM (or other component) of the gateway 120 is responsible for allocating slots in the TDMA communication frame for all connected terminals 102a-102c. Typically, the amount of bandwidth allocated and the corresponding slot assignments are updated frequently, often for each frame. The assignments are typically required to be performed very quickly, for example, within a period of 4-5 milliseconds or less, so the new slot assignments can be sent and reach terminals in time to be used in the next frame.

Assigning bandwidth can be challenging because the IGM may be responsible for making assignments to each of dozens, hundreds, or thousands of different devices that are concurrently active and communicating using the network. Some algorithms used for bandwidth allocation attempt to take into account the various amount of data transfer backlog for each terminal 102a-102c along with other system parameters, and the complexity and computational demand of computing the optimal allocations increases greatly with increasing numbers of concurrently active terminals 102a-102c. Some bandwidth allocation algorithms also assign bandwidth sequentially, one terminal at a time, so the system can take into account current allocations in making the remaining allocations needed. This creates a bottleneck in computing the allocations, because the allocation for a terminal depends on allocations being made for one or more other terminals. This type of sequential computation can provide very accurate results, but often the computational demands are too high for the IGM to complete within the limited time available between frames.

The efficiency and capacity of the IGM to generate bandwidth allocations can be significantly improved by using a trained machine learning model to perform allocation decisions rather than using existing computed algorithms. The machine learning model can be trained using examples of the results from algorithms, so the model learns to provide results that sufficiently replicate or approximate the results from the algorithms. However, the machine learning model can learn to provide these results based on inputs that do not require dependency on other allocation decisions for the upcoming frame. In other words, the machine learning model can be trained to provide the highly accurate results generated sequentially using dependencies among allocations, even from inputs that do not indicate reflect any dependency. In this manner, the model learns the general pattern of allocation decisions, implicitly learning the conditions that tend to result in dependencies that alter allocation decisions even though dependencies are not indicated to the model. Because the machine learning model decisions are made using less information than the more complex sequentially computed algorithms, the machine learning approach can provide a tradeoff of somewhat less optimal allocation in exchange for significantly faster processing. As a result, the model can be used to generate allocation decisions that are (1) more accurate than traditional algorithms that would not take into account the full set of active terminals, and (2) faster and more efficient than algorithms that would take into account the full set of active terminals.

The example of FIG. 1 shows a gateway 120 using a machine learning model 124 to determine amounts of bandwidth to allocate to different terminals 102a-102c. The gateway 120 also has bandwidth allocation algorithms 126 that can be used to make allocation decisions. The results of using the bandwidth allocation algorithms 126, as well as the inputs to the algorithms 126 that resulted in the results, can be stored in data storage 127 and used to train the machine learning model 124. The example of using the machine learning model 124 will be discussed using various stages labeled (A) to (F), which represent a flow of data and can be performed in the order indicated or in another order.

Below, various aspects of satellite networks will be discussed, followed by a discussion of the bandwidth allocation algorithms 126 and then the machine learning model(s) 124 that can approximate or replicate the function of the bandwidth allocation algorithms 126.

In the system 100, each terminal 102a-102c has a satellite beam assignment and a gateway assignment. In general, when a terminal 102a-102c is installed, a beam assignment (e.g., a spot beam of satellite 115) is determined based on the location of the terminal 102a-102c. Each terminal 102a-102c is assigned to only one beam or resource pool at a time. Each beam has one or more gateways associated with it.

The spectrum of one satellite beam can be segmented into a plurality of inroutes. For example, the frequency spectrum of a satellite beam can be split into a number of inroutes with symbol rates of, for example, 512 kilosymbols per second (ksps), 1 megasymbols per second (Msps), 2 Msps, 4 Msps, etc. Inroutes within a certain geographical area that share these spectrum resources can be handled hierarchically. A grouping of inroutes that are at the same symbol rate and handled as a common pool can be referred to as an inroute group (IG). IGs of multiple symbol rates can also be handled as a common pool or set. The entire shared spectrum of a given satellite spot beam may be split into several such common sets. An IGM can refer to a network entity that manages bandwidth for such a common set of multiple IGs. Depending on the digital modulation scheme that is utilized (e.g., quadrature phase shift keying (QPSK)), the number of symbols used to communication can vary, and as such, the symbol rate can also vary. The number of bits per symbol used to communicate can vary, and as such, the total capacity can also vary.

It should be noted that an IGM can be independent of a particular beam of the satellite, but an inroute is dependent on an IGM. Therefore, an IGM can manage inroutes of different beams, but any one particular inroute may be managed by only a single IGM. These features of a satellite network can be leveraged to allocate bandwidth for and govern network usage of terminal groups (TGs) over a multi-beam satellite network.

Accordingly, various implementations of the systems and methods disclosed herein provide techniques for bandwidth management among TGs in a shared access network. Such techniques may be applicable to network resources providing service in the same direction, e.g., from an access point to an aggregation point or from an aggregation point to an access point.

In some implementations, an IGM determines current or actual bandwidth usage for terminals in multiple TGs that share inroutes managed by the IGM. The IGM shares this information with a bandwidth manager, which evaluates the current or actual throughputs of the TGs against their respective subscribed rates. Depending on the throughput of a TG relative to its minimum and maximum subscribed rates, the bandwidth manager issues a scaling factor for that TG, which either increases, decreases or maintains the throughput of that TG.

The IGM receives the scaling factors from the bandwidth manager and applies these factors to their respective terminals in its TGs. Thus, each IGM may perform throughput management via bandwidth allocation for terminals in multiple TGs that share inroutes managed by the IGM. And accordingly, the bandwidth manager can perform throughput management of individual TGs throughout an entire network, which may contain multiple IGMs.

Throughput can refer to the rate at which digital bits of information are transferred over some communication channel and can be measured in, e.g., bits/second or in the case of data packets, in data packets/second or data packets/time slot. Throughput can be considered, essentially, to be synonymous with digital bandwidth consumption.

At the bandwidth manager level, bandwidth management can be considered to be "centralized" in that throughput can be managed network-wide for each TG (based on congestion status of the network and subscription rate profile/plan). At the IGM level, bandwidth management can be considered as being "distributed" in that an IGM can perform throughput management (independently of other IGMs), where the maximum throughput level to which a terminal (in a TG) is entitled can be realized. Accounting for all of these considerations can be accomplished through the use of a scaling factor that can be introduced by the bandwidth manager at the IGM level (for each TG) that is based on the available bandwidth of an IGM and the throughput of each TG. Hence, a hybrid, centralized-distributed feedback control mechanism may be achieved for managing bandwidth in accordance with various implementations. It should be noted that although various implementations for providing bandwidth management are described in the context of the inroute, various implementations can provide bandwidth management on the outroute in addition or as an alternative. Various implementations are also applicable to any wireless or wireline networks where throughput limits based on subscribed rates need to be imposed upon a group of users that may be spread over different IGM sub-systems or geo-locations inside the network.

It should be noted that although various implementations described herein are directed to the aforementioned hybrid, centralized-distributed feedback control mechanism, other implementations can be a completely centralized solution, e.g., where the bandwidth manager controls bandwidth management. Alternatively still, a completely decentralized implementation is also possible from an IGM-level perspective.

As alluded to above, an IGM may perform throughput management via bandwidth allocation for terminals in multiple TGs that share inroutes managed by the IGM. A TG in a network can be bounded by/associated with a subscription rate plan/profile. The IGM is also aware of, e.g., what terminals in a TG exist, where those terminals may be operating and with what IG they are associated, in addition to how much bandwidth each terminal in the TG is using. Accordingly, on the inroute, the IGM can manage IGs while tracking the throughput of each terminal in a particular TG and across multiple TGs if necessary.

The IGM can report this tracked throughput information/bandwidth usage to a (centralized) bandwidth manager. As also alluded to above, a bandwidth manager can perform throughput management of individual TGs throughout an entire network, which may contain multiple IGMs. That is, the bandwidth manager can monitor bandwidth usage for each TG across multiple IGMs, and determine whether or not the bandwidth usage remains within the parameters/limits of the subscription rate plan associated with each TG. If the throughput remains within the subscription rate plan parameters, the bandwidth manager may simply allow the terminals, TGs, and IGs to operate in the manner with which they are currently operating. In accordance with some implementations, the bandwidth manager can also "scale up" the applicable throughput where there is sufficient available bandwidth. On the other hand, and if the throughput of a TG exceeds or at the least begins to approach the subscription rate plan limits for bandwidth usage, the bandwidth manager can instruct the IGM managing the IG with which the TG is associated, to throttle down on bandwidth consumption until the subscription rate plan limits can be met or are no longer exceeded. Hence, the IGM can react to bandwidth manager control (when needed) via a scaling factor in order to remain within the bandwidth usage parameters of a TG's subscription rate plan. It should be noted that because, as described above, symbols can be divided, use of a scaling factor at an IGM to "indirectly" adjust bandwidth allocation can be preferable to some manner of centralized control in certain scenarios.

Each IGM can manage multiple channels, e.g., two inroutes having symbol rates of 4 Msps. On the inroute, the bandwidth manager is aware of the subscription rate for each TG. By way of the IGM reporting, the bandwidth manager is also aware of how much bandwidth each terminal/TG is consuming within each applicable IGM and across multiple IGMs.

Referring to the gateway 120, one or more bandwidth allocation algorithms 126 can be used to determine allocations. Major functions of the allocation algorithms 126 are to (1) allocate bandwidth at the priority level and (2) allocate bandwidth at the terminal level.

To allocate bandwidth at the priority level, the algorithms 126 can use two loops. The IGM uses a first loop that uses preconfigured priority weights to pre-allocate bandwidth for each of multiple queues representing different priority levels. The IGM uses a second loop to adjust the bandwidth for each queue based on an aggregated measure of backlog among active terminals.

To allocate bandwidth at the terminal level, the IGM may perform various calculations for each terminal. For example, the IGM may calculate a bandwidth budget amount for a terminal based on the service plan for the terminal, taking into account constant bit rate (CBR) requirements (e.g., for voice or other real-time transfers), express, and scaling factors. As a result, this budget amount is not a static value. The IGM may calculate a carryover bandwidth amount based on previous unused bandwidth (e.g., a measure of accumulated unused service plan bandwidth over the last few frames). A throughput amount and/or ratios (e.g., a throughput divided by a service-plan-allowed maximum throughput) can also be calculated, and sorting among terminals is done based on ratios. A maximum bandwidth for the terminal is determined, for example, as a sum of the bandwidth budget amount and the carryover budget amount. Finally, a requested bandwidth amount is calculated, which can be the minimum of the maximum bandwidth calculated for the terminal, the backlog data amount for the terminal, and the available bandwidth for allocation.

The inputs for the algorithms 126 include backlog reports from the terminals, total available bandwidth of the inroute, the predefined priority weights, and the scaling factors. The output is the overall bandwidth allocation for each terminal. As each terminal has its allocation determined, the IGM decreases the amount of bandwidth available in the upcoming frame, sequentially assigning allocations to the various terminals. In computing the algorithms 126, there are multiple uses of terminal backlog amounts and service plan bandwidth amounts. Also, some of the intermediate results are influenced by the relative values of the other parameters. While the algorithms 126 consider many different allocation scenarios, the fact that many of the inputs are used multiple times indicates there is some room for simplifying the calculations. The algorithm's reliance on current available bandwidth is also a bottleneck for the performance, because it makes difficult to parallelize the algorithms 126 to an analysis running multiple instances in different threads.

To be able to train the machine learning model 124 to perform the function of the algorithms 126, data indicating actual situations experienced by gateways and the actual results of the algorithms 126 can be collected. The results from the algorithms 126 and the inputs that led to those results are used as training data. A supervised training approach can be used to derive an appropriate model 124 for the IGM to use. For example, training can cause the model 124 to learn relationships between the inputs and outputs to the algorithms 126, to guide the model 124 to produce outputs that match or are close to outputs provided by the algorithms 126 in the same scenario. Ultimately, the model 124 provides an allocation technique that can be run in multiple instances concurrently, allowing an IGM to calculate the bandwidth to allocate to multiple terminals in parallel. Multiple copies of the model 124 can then be run concurrently to make allocation decisions for terminals.

An IGM normally has a log to keep track of allocation related statistics. The logging function can be enhanced to collect any data needed to provide model training data. Key inputs to the algorithms 126 that are collected include (1) the terminals' backlog, (2) total available bandwidth, (3) the predefined priority weights, and (4) the scaling factors. The output of the algorithms 126 is the overall bandwidth allocation for each terminal, e.g., a number of slots in a TDMA frame. Other information can be used, such as a distribution of backlog among priority levels, bandwidth allocation to different priority levels, and so on. Optionally, there are a few intermediate results from the algorithms 124 that may be useful such as the budget bandwidth amount, the carryover bandwidth amount, and throughput. These additional elements may be used for the initial model training as auxiliary input data.

More specifically, a set of main inputs to the algorithms can be collected and subsequently used as inputs to the machine learning model 124. In general, at least some terminal-related configuration information comes from the link layer. Examples of collected data types used for input to the model 124 include, for a given terminal:

(1) a last allocation history, indicating previous allocations to the terminal over the last few frames;
(2) a last non-CBR allocation history, indicating an amount of allocations over the last few frames that are not CBR or real-time transfers (e.g., not voice-over-IP (VOIP) or similar traffic);
(3) an last backlog update time for the terminal, indicating the last time the terminal updated its backlog (e.g., a frame number for the last frame in which the backlog report was received);
(4) a number of CBR slots reserved for the terminal,
(5) advertised backlog slot amounts for the terminal for each priority level, e.g., values showing the amount the terminal indicates to the IGM for each priority level;
(6) current backlog slot amounts for the terminal for each priority level, values showing the amounts of current outstanding backlog on the IGM side for the terminal at the end of the prior frame (this can be involve by subtracting how many backlog slots are recently allocated);
(7) a scaling factor for the service provider for the terminal, e.g., a factor received from a VNO controller, based on a layer of flow control (e.g., a measure that can be used to monitor overall usage of a service provider as a whole, which can be used to determine if one service provider is over a corresponding quota); and
(8) a throughput measure showing actual user data sent in the last frame for the terminal.

In some implementations, there are three priority levels for data transfer in addition to the priority of CBR transfers have the highest priority. As the CBR transfers typically do not have a backlog, there may be three different values of current backlog and three different values for advertised backlog, one for each of the three priority levels. For example, a first priority level corresponds to active, interactive communications, such as web browsing, which receives high priority. A second priority level corresponds to streaming content, such as audio or video streaming, that receives intermediate priority. A third priority level can correspond to bulk transfers, such as file uploads, that receive low priority. More or fewer priority levels may be used in various implementations.

Various other data can be collected and used as auxiliary inputs to the model 124 for training and for generating predictions. Examples of the auxiliary data for a terminal include:

(1) a unique identifier for the terminal;
(2) an identifier for a service provider or reseller;
(3) a quality of service type code;
(4) amounts of unused bandwidth for the terminal for each of the priority levels;
(5) a number of CBR slots allocated to the terminal;
(6) maximum bandwidth amounts allowed for the terminal, for each of the priority levels (these may be calculated based on information about the service plan for the terminal, taking into account inroute capacity); and
(7) a forward error correction rate.

The outputs of the algorithms 126, and consequently the outputs of the machine learning model 124 as well, can include an amount of slots allocated for each of the priority levels. As the algorithms 126 are used, whether in user-facing production settings or in simulated or test scenarios, the parameters noted above and the outputs of the algorithms 126 are collected and then used for training the model 124.

In some implementations, the data to be used for model training can be collected in a laboratory setting or controlled environment while a load simulator mimics the traffic patterns for different scenarios. Alternatively, data for training can be collected from a live network. In some cases, the collection of the data may require extensive I/O operations, and keeping the data collection on a live network might impact the performance of an IGM.

Before using the collected data for model training, the system can analyze and prune the data collected. For example, data sets with backlog indications of zero (e.g., no data to be transferred) can be pruned because the output of the algorithms 126 and the model 124 will be zero slots allocated to address backlog. An analysis of the data can also determine if the set of collected examples can adequately represent various traffic patterns, and if not, can be used to determine the types of additional data collection to perform to address additional traffic patterns.

The machine learning model 124 can be trained to use the same types of input information as the algorithms 126. During training, the model 124 will attempt to learn patterns from among the sets of examples used in training. This can involve learning about the different allocation results that need to be made for different conditions, such as for peak times vs. non-peak times, for different levels of congestion, for different levels of throughput, and so on.

The training process is intended to produce a trained model 124 that can be sufficiently accurate for making allocation decisions, and also measurably faster than the algorithms 126 be able to replace the original backlog bandwidth allocation algorithms 126. While with proper training set, it is possible to apply this model to all use cases. However, the chances of overfitting with large set of data is high. On the other hand, the performance benefit of the model 124 is most useful when a great number of terminals are actively connected in the system. Therefore, one approach is for the gateway 120 to evaluate current conditions to select whether to use the algorithms 126 or the model 124 to determine allocations. This can be done by setting a threshold, such as a number of terminals in the inroutes or a CPU usage of the IGM or gateway 120. Below the threshold, the IGM will use the original algorithms 126, but if the threshold is met, the IGM will switch to using the model 124 instead. The decision of which technique to employ may be revisited periodically, for example, after a certain amount of time or a certain number of frames.

An example of how the model 124 can be used will now be described with reference to FIG. 1. In stage (A), the terminals 102a-102c send backlog reports. These backlog reports can indicate amounts of data the respective terminals 102a-102c desire to send and/or receive over the satellite network connection. In some implementations, the requests may be for return channel allocations, from gateway to terminal. Backlog reports can sent periodically by the terminals 102a-102c over the course of a communication session. In some cases, backlog reports may be sent for each communication frame.

In stage (B), the satellite 115 forwards the backlog reports 106 to the gateway 120.

In stage (C), the gateway 120 obtains information needed to determine bandwidth allocation. In addition to the backlog amounts indicated in the backlog reports, the gateway 120 can use other information about the terminals and the communication system. This information includes bandwidth data 121, connection data 122, and system status 123. Bandwidth data 121 can include an amount of bandwidth currently available for allocation. Connection data 122 relates to the communication channel between the gateway and the terminal. This can include information for individual terminals (e.g., data transfer backlog, prior allocations to the terminal, service plan limits for the terminal, etc.) as well as information about the gateway 120 or inroute generally (e.g., status, throughput, congestion, amounts of connected terminals, etc.). System status data 123 can include data indicating the current status of the gateway 120, network connections, or other components of the system. In general, different combinations and sub-combinations of the main inputs and auxiliary inputs discussed above can be obtained and provided to the model 124. More or fewer inputs than are illustrated can be used.

In stage (D), the allocation machine learning model 124 receives and processes the input information for individual terminals to generate allocation predictions. In some implementations, the model 124 is trained to allocate bandwidth for data transfer backlog, which may be separate from CBR traffic.

The model 124 has been trained to determine the allocation for a single terminal at a time, and so the model 124 is provided data corresponding to a single terminal. Multiple instances of the model 124 can be run in parallel to generate allocation predictions for each of the respective terminals 102a-102c connected in the system.

For each instance of the model 124, the main inputs will be those directly related to the allocation, such as backlog amounts for a particular terminal (e.g., backlog amounts for each of multiple different priority levels), available bandwidth (e.g., for the inroute as a whole), priority weights (e.g., indicating relative weighting among traffic for different priority levels), and scaling factors (e.g., adjustment factors for the terminal, inroute, gateway, service plan, service provider, or system as a whole). Other factors can also be provided, such as a number of terminals connected to the inroute or gateway 120, which can provide an indication of levels of aggregate demand or congestion in the system.

As noted above, in some implementations, the input to the model includes one or more of: a identifier for the terminal, an indication of the service plan for the terminal, an indication of one or more recent allocations to the terminal (e.g., allocation history), an indication of one or more recent non-CBR allocations to the terminal (e.g., allocation history), an indication of a time of the last backlog update for the terminal, an amount of CBR bandwidth (e.g., a number of slots) reserved for the terminal, an indication of advertised backlog (e.g., a number of slots) for the terminal, an indication of current backlog (e.g., a number of slots) for the terminal, scaling factors applicable to the terminal, and/or a measure of throughput for the terminal. For each of the parameters relating to backlog and prior allocations, values can be provided for each of the different priority levels (e.g., advertised backlog level for priority level 1, advertised backlog level for priority level 2, advertised backlog level for priority level 3). In some implementations, one or more auxiliary inputs are also provided as input to the model 124, such as one or more of: an identifier for a virtual network operator (VNO) corresponding to the terminal, an indicator of a quality of service (QoS) type for the terminal, a measure of unused bandwidth for the terminal, a measure of CBR slots allocated for the terminal, and/or a forward error correction (FEC) rate for the terminal.

In response to receiving the input data for a terminal, the model 124 provides outputs 129 that includes, for example, an amount of TDMA slots to allocate to the terminal in the current or upcoming TDMA frame, for each priority level. Other backlog allocation algorithm statistics can also be predicted. In some implementations, some bandwidth, such as reservations for CBR traffic, can be allocated separately, such that the model 124 focuses on predicting appropriate allocations to address backlog only. The IGM generates a set of model outputs 129 for each terminal 102a-102c connected to the IGM, using multiple instances of the model 124 to make generate sets of outputs 129 for different terminals 102a-102c and/or using instances to sequentially generate sets of outputs for different terminals 102a-102c.

As discussed above, the model 124 has been trained to approximate the results of the allocation algorithms 126. The training uses actual results given by the algorithms 126 in previous situations as the examples used to teach the model 124 how to make allocation predictions. As a result, the trained model 124 can provide output that is very similar to the output of the algorithms 126. Using the model 124 removes dependency among allocation decisions of the terminals and reduces computational demands while still providing similar accuracy of bandwidth allocation as the algorithms 126.

In stage (E), the IGM or gateway 120 uses the model outputs 129 for the respective terminals 102a-102c to perform bandwidth allocation 125. This can include assigning specific slots in a TDMA frame to specific terminals 102a-102c. In non-TDMA systems, communication resources can be allocated using other measures, and the model 124 can be trained to receive and predict communication resource amounts using those other measures. The IGM can combine CBR allocations and backlog allocations at this stage, to determine the overall amount of bandwidth to assign to each terminal 102a-102c.

In some implementations, the IGM directly allocates bandwidth as predicted by the model 124, assigning a number of slots to each terminal 102a-102c for each priority level as indicated in the model outputs 129. In some implementations, one or more post-processing steps may be applied. For example, a series of rules can be used to validate the appropriateness of the predicted allocations and to adjust those predictions if needed. For example, the total amount of bandwidth allocated by the various model outputs 129 can be compared to the available bandwidth, and the various allocation amounts can be reduced (e.g., scaled down) if the aggregate amount of predicted allocations would exceed the available bandwidth. As another example, the various allocation amounts can be increased (e.g., scaled up) if the aggregate amount of predicted allocations is significantly less than the available bandwidth, in order to more efficiently use the channel capacity.

In stage (F), the gateway 120 communicates the allocation assignments to the terminals 102a-102c. For example, the gateway 120 transmits data indicating the allocations to the respective terminals 102a-102c through the satellite communication channel.

The actions of stages (A) to (F) can be performed for each of the terminals 102a-102c that are in communication with the gateway 120. The actions can also be repeated over time for each terminal 102a-102c while the terminal 102a-102c is in communication with the gateway 120 or IGM. For example, terminals 102a-102c can periodically send new backlog reports 106a-106c, which are used to generate new sets of inputs to the machine learning model 124 and consequently generate new bandwidth allocations. In some implementations, the model 124 is used to determine a new predicted allocation, resulting in a new actual allocation, at the beginning of each of multiple successive frames. The fact that the model 124 does not require dependency among the predictions and is less computationally demanding than the algorithms 126 can greatly improve the performance of the system.

In some implementations, the gateway 120 can use the allocation algorithms 126 instead of the allocation machine learning model 124. The allocation algorithms 126 can analyze the bandwidth requirements of the terminal and the system. The allocation algorithms 126 can provide a high level of optimization, but are often computationally intensive. There is also latency due to the dependencies involved in sequentially computing each terminal's needs. Given the need to determine the information very quickly (e.g., 4 to 5 milliseconds), the fully optimized computation need not always be performed for large numbers of terminals. The output can be used in bandwidth allocation 125. The output can also be stored as data 127 for future use.

In some implementations, the choice to use allocation machine learning model 124 or the allocation algorithms 126 can be determined by a threshold of usage (e.g., CPU usage, number of terminals). For example, if the number of terminals is less than fifty devices, the gateway 120 can direct inputs 121, 122, and 123 into allocation algorithms 126 instead of the allocation machine learning model 124. The result of the algorithms 126 can be used for bandwidth allocation 125, stored in database 127, or sent back to terminals.

Figure 2:
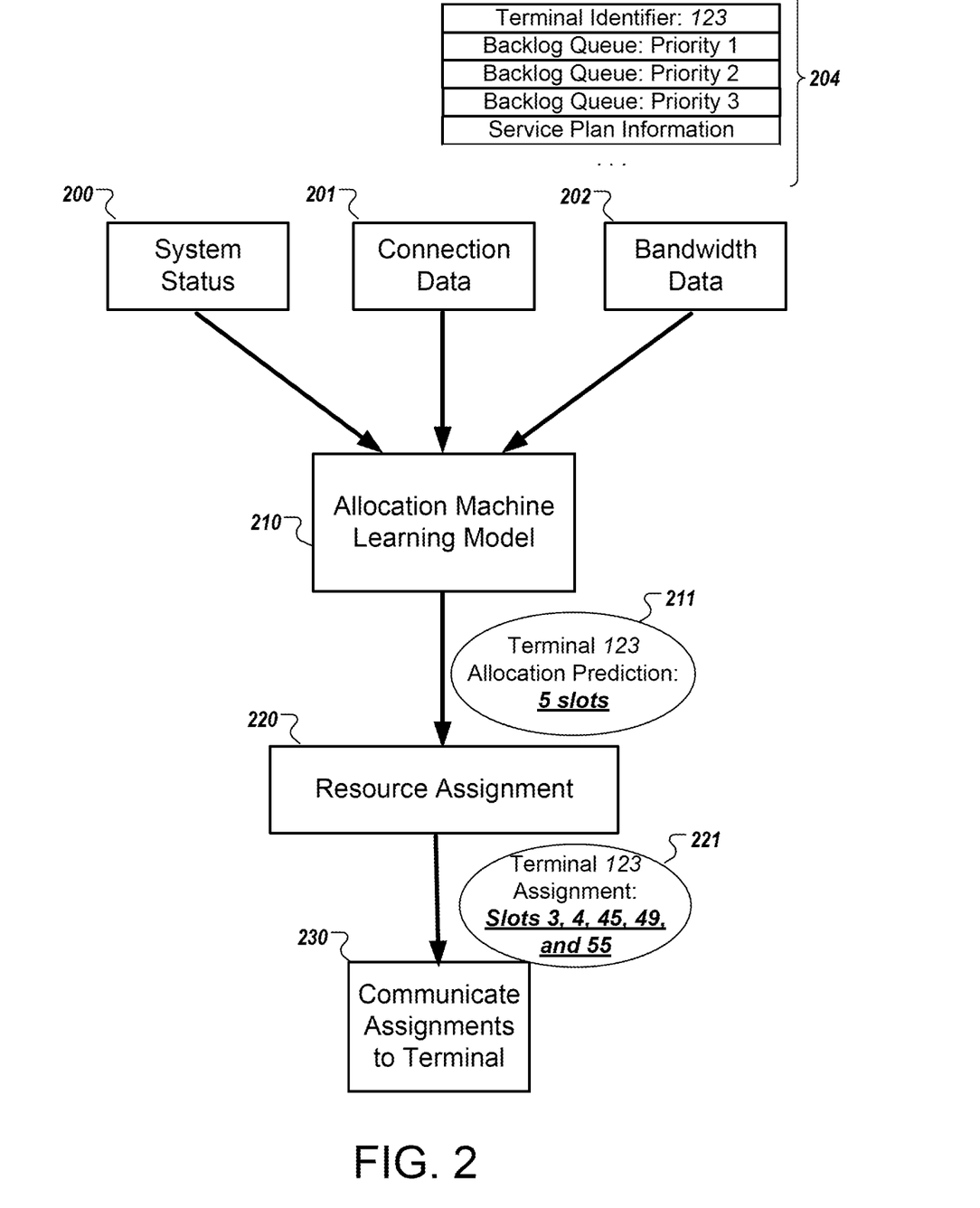
FIG. 2 is a diagram of the machine learning model bandwidth allocation process.

FIG. 2 is a diagram of the machine learning model bandwidth allocation process. Item 204 shows sample data related to a terminal with an identifier number of 123.

FIG. 2 shows data in the form of system status 200, connection data 201, and bandwidth data 202, used as input for the allocation machine learning model 210. An example of one of the model's prediction is shown in item 211. The allocation machine learning model 210 predicts 5 slots within a data frame for terminal 123.

The predictions of the allocation machine learning model 210 are sent to a resource assignment 220. The assignments can be made based on allocation predictions and communicated to the terminals. For example, the prediction 211 of the model 210 contains a prediction of 5 slots for terminal 123. The resource assignment 220 can choose which slots, for a total of 5, terminal 123 should be assigned. In this case, slots 3, 4, 45, 49, and 55, shown in item 221, will be used. This assignment 221 can be processed by a component 230 which can take the assignment 221 and use a channel of communication to communicate assignments back to respective terminals.

Figure 3:
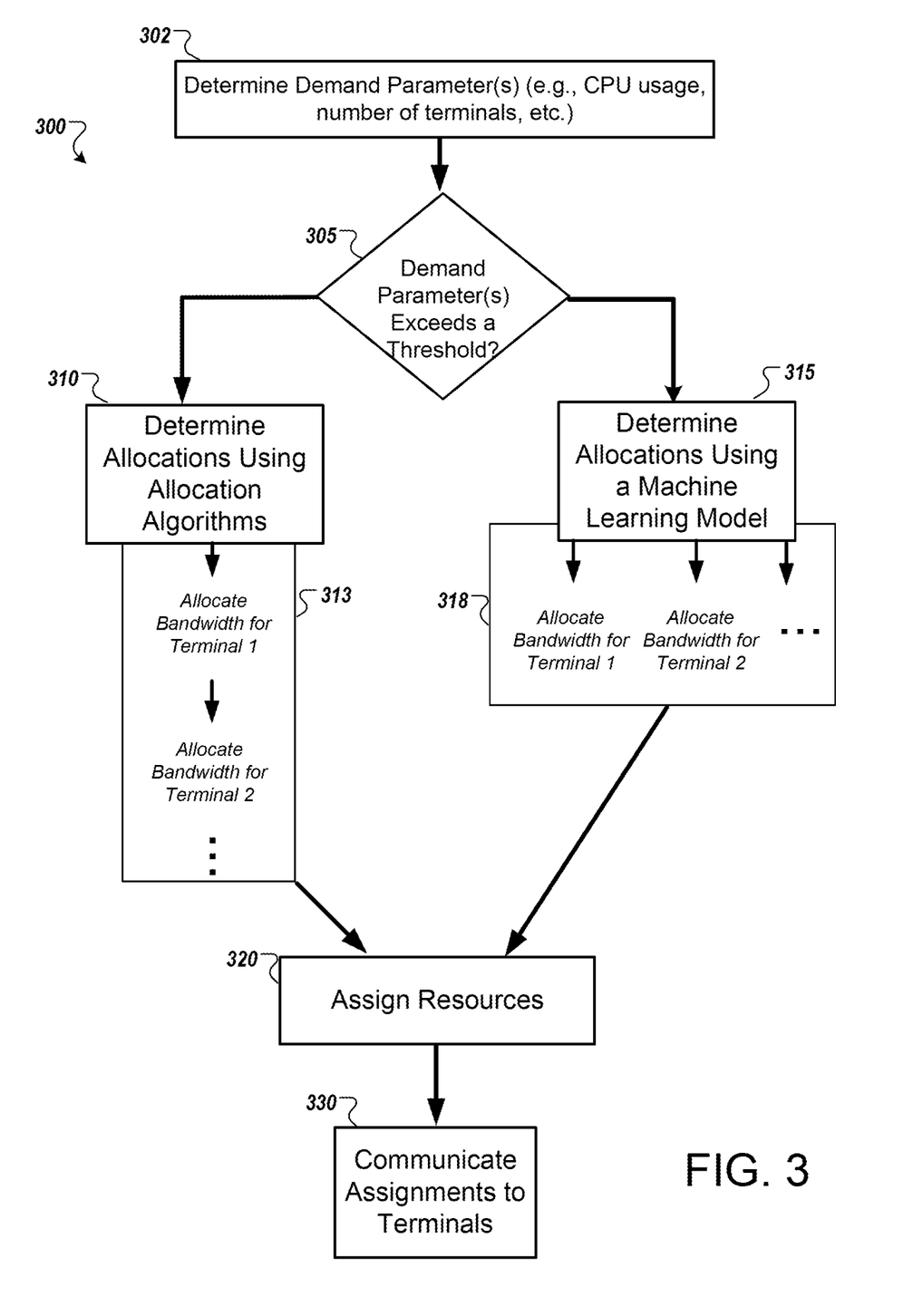
FIG. 3 is a diagram depicting a technique for selecting between multiple bandwidth allocation techniques.

FIG. 3 is a flow diagram 300 depicting a technique for selecting between multiple bandwidth allocation techniques. This example shows how a system, such as the gateway 120 or an IGM, can switch between using different allocation techniques to address different conditions.

The technique first determines a demand parameter, e.g., a value indicative of or correlated to a level of demand in the communication system (302). In some cases, using the allocation algorithms 126 may be more desirable when demand is relatively low (e.g., lower numbers of connected terminals, lower traffic, etc.). In this situation, the precision of the algorithms 126 is beneficial and the computation may be within acceptable levels. On the other hand, when demand is high (e.g., large numbers of connected terminals, high traffic, etc.) the computational demand of the algorithms 126 and the latency they would require may be too high, making the use of the machine learning model 124 a better choice.

In some implementations, the demand parameter can be a number of connected terminals, an amount of data traffic, an amount of CPU usage (e.g., which is typically higher when device connections and/or traffic is high), and so on. Multiple demand parameters may be generated and used in some implementations.

The system then determines whether the demand parameter exceeds a threshold (305). The threshold can be a predetermined maximum threshold, for example, a CPU usage of "75%" or a number of terminals of "200." If the demand parameter exceeds the corresponding threshold, the system selects to perform backlog bandwidth allocation using the allocation machine learning model 124 (315). If the demand parameter does not exceed a threshold, the allocation algorithms 126 can be used (310).

In some implementations, the decision can be based on any of multiple parameters, each with a corresponding threshold. For example, CPU usage and amount of connected terminals may each be separately monitored, and exceeding either threshold may cause the machine learning model to be used. In some implementations, the selection of an allocation technique may be based on a combination of multiple conditions each occurring. For example, the selection of the machine learning model may require thresholds to be satisfied for both CPU usage and a number of connected terminals.

In some implementations, other demand parameters together with other thresholds and limits can be used to switch between model-based and algorithm-based allocation techniques. For example, a limit could be used for the amount of CPU resources available to the allocation algorithms. Exceeding a threshold of available resources could signal low network traffic and could therefore invoke an algorithm-based allocation method. Falling below the threshold could invoke a model-based allocation method.

If allocation algorithms 126 are used (e.g., step 310), allocation can proceed as shown in item 313. Terminals can have their allocations decided sequentially, with later allocations depending on the results of the earlier allocations. The process can continue until all terminals have allocations. Allocations calculated with the allocation algorithms 126 can be passed to be used for assigning resources (e.g., TDMA slots) consistent with the allocation results (320).

If an allocation machine learning model 124 is used (step 315), allocation can proceed as shown in item 318. Instances of the machine learning model 124 can predict allocations concurrently, as opposed to sequentially as may be done using the allocation algorithms 126 in step 310. Allocations calculated with the allocation machine learning model 315 can be passed to be used for assigning resources (e.g., TDMA slots) consistent with the allocation results (320).

Resource assignment 320 can take the bandwidth allocations of either the allocation algorithms 310 or the allocation machine learning model 315 and assign resources respectively. The resource assignments can be sent to component 330 which can communicate the assignments to respective terminals.

The technique of FIG. 3 can be used to evaluate which allocation technique to use at various times, for example, for each communication frame, periodically (potentially after multiple frames or after some time period has elapsed), or in response to changes in one or more demand parameters.

Figure 4:
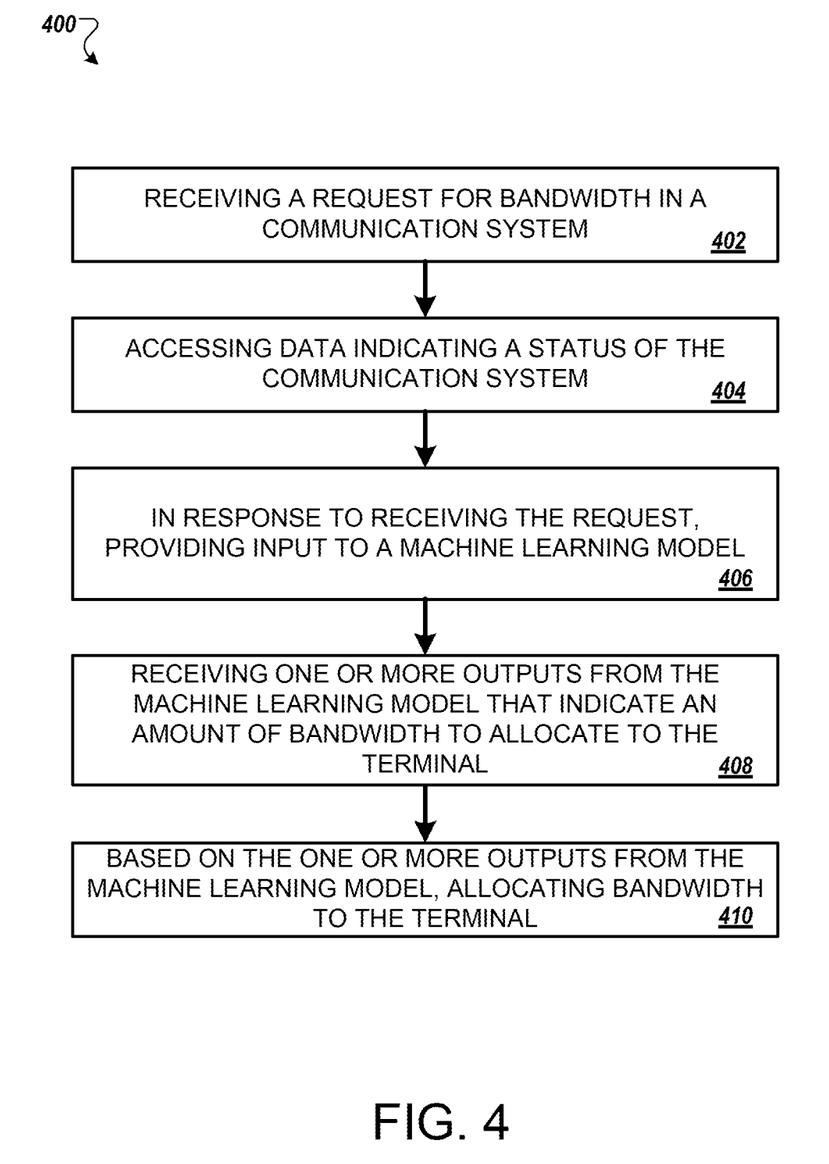
FIG. 4 is a flow diagram illustrating an example of a process for bandwidth allocation.

FIG. 4 shows a flow diagram illustrating an example of a process for backlog bandwidth allocation. The process 400 may be performed by one or more electronic devices, for example, such as the gateway 120 of FIG. 1, an IGM, or another device or system.

The process 400 includes receiving a request for bandwidth in a communication system (402). For example, a terminal 102a can send a request along with backlog data 106a through a communication route to a gateway 120. In some implementations, the request for bandwidth is a request sent by the terminal. In some implementations, the request for bandwidth is sent by a server sending data to the terminal. The request can be an indication of a backlog or queue of data to be transferred. The request may include an indication of an amount of data transfer backlog for a terminal for each of multiple priority levels or QoS classes.

The process 400 includes accessing data indicating a status of the communication system (404). For example, the data can include information indicating an amount of bandwidth available to be allocated, an amount of terminals currently connected in the system (e.g., the number competing for use of the same resource, such as an inroute, outroute, beam, channel, etc.), current or recent throughput, and potentially other factors as discussed above. In general, the status information may be information that represents the current or recent situation experienced by the communication system, thus context information or operating information about components of the communication system can be obtained and used.

In some implementations, the data indicating the status of the communication system includes (i) data indicating current demand or throughput of the system, (ii) data indicating prior demand or throughput of the system, (iii) data indicating a data transfer capacity or an available bandwidth of the communication system.

The process 400 includes providing input to a machine learning model in response to receiving the request for bandwidth (406). The machine learning model can be one trained to predict bandwidth allocation. For example, the model can be one trained to use information about the status of the communication system (e.g., an amount of bandwidth to be allocated, a number of terminals, priority weights or settings, etc.) as well as information about the terminal for which allocation is predicted (e.g., a backlog bandwidth amount, recent allocations and throughput for the terminal, etc.) The information about the communication system and the information about the terminal can be combined and both can be provided to the model, e.g., at an input layer of a trained neural network. The machine learning model can include at least one of a neural network, a classifier, a decision tree, a support vector machine, a regression model, a nearest neighbor method such as K-means or K-nearest neighbor, a dimensionality reduction algorithm, or a boosting algorithm.

In some implementations, the machine learning model is provided at least one of a priority of data to be transferred, a type of data to be transferred, a bandwidth limit associated with the terminal, a terminal identifier, a quality of service level, or an error correction rate. Other information about the terminal, the data to be transferred, the communication system, and so on may be used as input to make a prediction. Other information, including information about a service plan for the terminal, data usage for a user account for the terminal or for the service provider associated with the terminal, etc. can also be obtained and used.

The process 400 includes receiving one or more outputs from the machine learning model that indicate an amount of bandwidth to allocate to the terminal (408). The output can include, for example, a value indicating an amount of slots predicted or recommended to be allocated to the terminal in the current or upcoming communication frame. Other information, such as intermediate outputs typically used in the calculations done using the algorithms 126 can also be predicted as outputs of the machine learning model.

The process 400 includes allocating bandwidth to the terminal based on the one or more outputs from the machine learning model (410). This can include allocating one or more slots in a time division multiple access (TDMA) communication frame. For example, the number of slots allocated can be based on the amount indicated by output of the machine learning model. The amount indicated by the model can be used, or an adjustment may be made to that amount. In FIG. 2, for example, an assignment of 5 slots is made predicted by the machine learning model, and specific TDMA slots numbered 3, 4, 45, 49, and 55 are assigned to the terminal for use in the upcoming TDMA frame. The terminal can then be provided an indication of the amount of bandwidth to allocate to the terminal, such as an indication of the allocated slots.

In some implementations, a number of terminals or a processor utilization is determined. One of multiple techniques for allocating bandwidth is selected based on the number of terminals or the processor utilization, for example, in response to determining that one of the values exceeds a relevant threshold. Allocating bandwidth to the terminal based on the one or more outputs from the machine learning model can be performed at least in part based on determining that the number of terminals or the processor utilization exceeds a threshold.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
   determining, for a terminal in a communication system, an amount of data pending for transmission by the terminal in the communication system;
   providing, as input to a machine learning model, data indicative of (i) the amount of data pending for transmission by the terminal and (ii) a status of the communication system, wherein the machine learning model has been trained to predict resource allocation for individual terminals based on input indicative of amounts of data to be transmitted by the respective individual terminals;
   receiving one or more outputs from the machine learning model that indicate an amount of bandwidth to allocate to the terminal; and
   allocating, to the terminal, resources for the terminal to transmit data in the communication system, wherein the amount of resources allocated is based on the one or more outputs from the machine learning model.

2. The method of claim 1, wherein the communication system comprises a satellite communication system.

3. The method of claim 1, wherein the amount of data pending for transmission by the terminal is determined based on a report from the terminal indicating an amount of data transfer backlog for the terminal.

4. The method of claim 3, wherein the report comprises an indication of an amount of data transfer backlog for the terminal for each of multiple priority levels.

5. The method of claim 1, wherein allocating bandwidth to the terminal comprises allocating one or more slots in a time division multiple access (TDMA) communication frame.

6. The method of claim 1, wherein the machine learning model comprises at least one of a neural network, a classifier, a decision tree, a support vector machine, a regression model, a nearest neighbor method such as K-means or K-nearest neighbor, a dimensionality reduction algorithm, or a boosting algorithm.

7. The method of claim 1, comprising:
   determining a number of terminals or a processor utilization; and
   determining that the number of terminals or the processor utilization exceeds a threshold;
   wherein allocating bandwidth to the terminal based on the one or more outputs from the machine learning model is performed at least in part based on determining that the number of terminals or the processor utilization exceeds a threshold.

8. The method of claim 1, wherein the machine learning model is provided at least one of a priority of data to be transferred, a type of data to be transferred, a bandwidth limit associated with the terminal, a terminal identifier, a quality of service level, or an error correction rate.

9. The method of claim 1, comprising providing, to the terminal, an indication of the amount of bandwidth allocated to the terminal.

10. One or more non-transitory machine-readable media storing instructions that, when executed by one or more processors, cause the one or more processors to perform operations comprising:
    determining, for a terminal in a communication system, an amount of data pending for transmission by the terminal in the communication system;
    providing, as input to a machine learning model, data indicative of (i) the amount of data pending for transmission by the terminal and (ii) a status of the communication system, wherein the machine learning model has been trained to predict resource allocation for individual terminals based on input indicative of amounts of data to be transmitted by the respective individual terminals;
    receiving one or more outputs from the machine learning model that indicate an amount of bandwidth to allocate to the terminal; and
    allocating, to the terminal, resources for the terminal to transmit data in the communication system, wherein the amount of resources allocated is based on the one or more outputs from the machine learning model.

11. The one or more non-transitory machine-readable of claim 10, wherein the communication system comprises a satellite communication system.

12. The one or more non-transitory machine-readable of claim 10, wherein the amount of data pending for transmission by the terminal is determined based on a report from the terminal indicating an amount of data transfer backlog for the terminal.

13. The one or more non-transitory machine-readable of claim 12, wherein the report comprises an indication of an amount of data transfer backlog for the terminal for each of multiple priority levels.

14. The one or more non-transitory machine-readable of claim 10, wherein allocating bandwidth to the terminal comprises allocating one or more slots in a time division multiple access (TDMA) communication frame.

15. A system comprising:
    one or more processors; and
    one or more machine-readable media storing instructions that, when executed by the one or more processors, cause the system to perform operations comprising:
       determining, for a terminal in a communication system, an amount of data pending for transmission by the terminal in the communication system;
       providing, as input to a machine learning model, data indicative of (i) the amount of data pending for transmission by the terminal and (ii) a status of the communication system, wherein the machine learning model has been trained to predict resource allocation for individual terminals based on input indicative of amounts of data to be transmitted by the respective individual terminals;
       receiving one or more outputs from the machine learning model that indicate an amount of bandwidth to allocate to the terminal; and
       allocating, to the terminal, resources for the terminal to transmit data in the communication system, wherein the amount of resources allocated is based on the one or more outputs from the machine learning model.

16. The system of claim 15, wherein the communication system comprises a satellite communication system.

17. The system of claim 15, wherein the amount of data pending for transmission by the terminal is determined based on a report from the terminal indicating an amount of data transfer backlog for the terminal.

18. The system of claim 17, wherein the report comprises an indication of an amount of data transfer backlog for the terminal for each of multiple priority levels.

19. The system of claim 15, wherein allocating bandwidth to the terminal comprises allocating one or more slots in a time division multiple access (TDMA) communication frame.

20. The system of claim 15, wherein the machine learning model comprises at least one of a neural network, a classifier, a decision tree, a support vector machine, a regression model, a nearest neighbor method such as K-means or K-nearest neighbor, a dimensionality reduction algorithm, or a boosting algorithm.

* * * * *